United States Patent [19]

Telfer

[11] 4,030,114
[45] June 14, 1977

[54] MODULAR PHOTOMACROGRAPHIC LIGHTING BRACKET

[76] Inventor: Jerry L. Telfer, 5th and Mission, San Francisco, Calif. 94119

[22] Filed: May 15, 1975

[21] Appl. No.: 577,656

[52] U.S. Cl. .............................. 354/295; 240/1.3; 248/159; 354/81; 354/293
[51] Int. Cl.² ................. G03B 17/56; G03B 15/03
[58] Field of Search ........... 354/81, 293, 294, 295; 240/1.3, 2 C, 73 BA, 73 BJ, 81 BF, 81 BA, 81 BD, 81 BC, 52 R, 67 R; 248/159, 245, 285, 286, 287

[56] References Cited

UNITED STATES PATENTS

| | | | |
|---|---|---|---|
| 1,706,239 | 3/1929 | Leon | 248/159 |
| 1,781,203 | 11/1930 | Teleki | 248/159 X |
| 2,530,912 | 11/1950 | Secofsky et al. | 240/2 C X |
| 2,551,753 | 5/1951 | McCullough | 240/1.3 X |
| 2,599,269 | 6/1952 | Markle | 354/81 R |
| 2,684,020 | 7/1954 | Kellner | 354/293 X |
| 2,697,776 | 12/1954 | Wale | 240/81 BE X |
| 3,258,585 | 6/1966 | Crete | 240/1.3 |
| 3,533,648 | 10/1970 | Thieberger | 240/52 R X |
| 3,586,852 | 6/1971 | Bradley | 240/81 BD |
| 3,589,260 | 6/1971 | Ferra | 354/293 |
| 3,604,913 | 9/1971 | Crete | 240/1.3 |

FOREIGN PATENTS OR APPLICATIONS 420,855  3/1967  Switzerland .................. 354/293

*Primary Examiner*—Edna M. O'Connor
*Attorney, Agent, or Firm*—Criddle, Thorpe & Western

[57] ABSTRACT

A modular lighting platform for photographing objects at close range comprising a mounting platform which may be slidably attached to the front of a camera bellows framework or directly attached to a camera body, tripod or the like. Attached to the platform is a plurality of extension arms which will pivot sideways about a fixed axis and can be locked in any pivotal position. Dual fastening means are contained on the extension arms for mounting auxiliary arms in a plane normal thereto and at any position along the length thereof. The length of the extension arms may vary and the auxiliary arms are slidably engaged in the dual fastening means such that the length between the extension arm and the end of the auxiliary arm may be regulated. The auxiliary arms may thereby be rotated about the extension arms and locked in any desired degree of rotation. Lighting devices, mirrors, reflectors and the like can be attached to the ends of either the extension or auxiliary arms thereby creating a miniature camera studio without the use of independent lighting.

12 Claims, 7 Drawing Figures

MODULAR PHOTOMACROGRAPHIC LIGHTING BRACKET

BACKGROUND OF THE INVENTION

This invention relates to a modular lighting platform for photographing small objects; more specifically, this invention is related to a modular lighting platform for the photographing of small objects where a reproduction ratio on the film will be near life size, life size, or greater than life size.

The photographing of small objects for extremely closeup photography (photomacrography) usually utilizes an extension bellows or other lens extension device between the lens and the camera body with a concomitant increase in exposure frequently compensated by the use of small electronic flash units. In most prior art devices these flash units are not readily adjustable but are set at a predetermined distance from the subject, which may or may not be acceptable for the required magnification of the object being photographed, i.e., such as a bee on a flower. For example, U.S. Pat. No. 3,195,431 shows a lighting unit movable with the camera bellows, but the lights are fixed to the face of the unit and are not adjustable. Other arrangements used for photomacrography are extension tubes and zoom lenses.

OBJECTS OF THE INVENTION

It is an object of the present invention to provide a modular photomacrographic lighting unit which is mounted on a camera, tripod or other object and is adjustable with relation thereto.

It is a further object of this invention to provide a lighting platform wherein lighting devices, mirrors, reflectors and the like can be attached to the mounting unit in adjustable positions.

It is another object of this invention to provide a modular lighting platform which is primarily intended to be attached to a camera for hand-held picture taking but which can also be affixed to a tripod or other stationary base.

It is a still further object of this invention to provide a modular photomacrographic lighting platform wherein the platform has arms extending outwardly from the mounting platform to which auxiliary arms can be attached in a plane normal to the outward extending arms, all of which are adjustable and providing means for attaching lighting devices, mirrors, reflectors and the like in any desired position relative to the subject to be photographed.

These and other objects may be accomplished by means of a novel modular lighting platform whereby it is possible to achieve the same lighting effect on the subject to be photographed as if the subject were in a camera studio. In other words, through the use of the present platform, the photographer can control the light quality on the subject without causing the photographer to lose the mobility associated with modern cameras. With the present invention it is possible to place one or more lights in various positions relative to the subject, i.e., light can come from above, below, behind or in front of the subject at any given angle and at variable distances. Since the platform is rigid after adjustment, critical flash distances may be measured accurately for properly compensated exposures, and lights may be variably placed for artistic or delineative effects, giving the photographer the same sort of control given the studio cameraman without the burden of cumbersome unattached lighting means.

Basically, the lighting platform consists of a mounting platform attached to a bellows framework, to the camera or to a tripod or similar means. When a bellows unit is utilized the platform is attached to the bellows unit by means of one or preferably two rods fitted into receptacles designed for receiving slide copy attachments. These rods slide into the receptacles and may be locked in place at any position into the receptacle by means of a set screw in the bellows framework which frictionally engages one of the rods holding it in a fixed position. When attached to a camera or tripod the mounting platform is fastened directly to the camera or tripod as will be hereinafter described. The mounting platform, in turn, supports a plurality, i.e., preferably two, three or more outwardly reaching independent movable extension arms which may be of the same or different lengths.

On one or more of the extension arms are mounted dual fastening means to which auxiliary arms may be mounted in a plane perpendicular to the extension arms. Both ends of the auxiliary arms and the outer ends of the extension arms are preferably threaded or adapted for quick release clamps for total modular interchangeability and the lighting units, reflectors, etc. can be attached to either of these arms by adaptors which screw or clamp on the arm ends. Any of the extension arms are mutually interchangeable so as to allow the user maximum flexibility in selecting the flash to subject distance and light placement. The dual fastening means are slidably along the extension arms and rotatable about such arms. The auxiliary arms are slidable within the dual fastening means so as to allow for any degree of positioning in relation to the extension arms. If desired one end of an auxiliary arm may be fitted with a counterweight to allow proper balancing. With such mobility it is possible for the photographer to adjust the extension and auxiliary arms in any desired position to create any desired combination and positioning of lighting.

The novel features of this invention both as to the manner of construction or organization, as well as the operation, will be better understood with reference to the following description and drawings. It is to be understood, however, that the description and drawings are for the purposes of illustration only and are not intended to be definitive as to the scope of this invention.

DRAWINGS OF THE INVENTION

DETAILED DESCRIPTION

Figure 1:
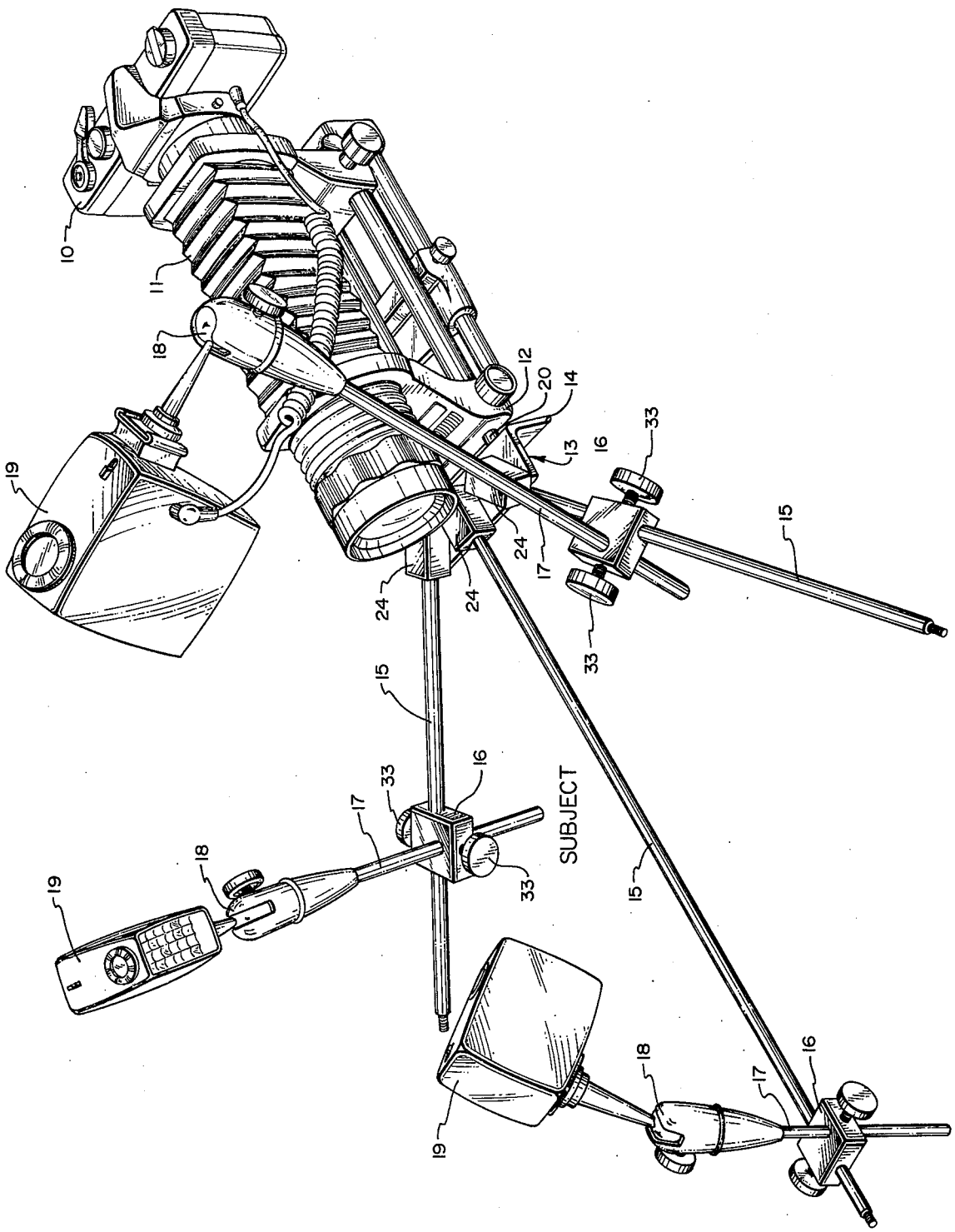
FIG. 1 is a side perspective view of the lighting platform in a completed arrangement thereof showing one possible lighting configuration.

Referring now to the drawings:

FIG. 1 shows a camera 10 having an expandable bellows 11 such bellows having a framework 12. The lighting platform noted generally as 13 consists of a mounting platform 14 to which extension arms 15 are attached. Extension arms 15 are pivotal from side to side. Attached to one or more of extension arms 15 are dual fastening 16 which are slidably engaged upon extension arms 15 and may be moved to any position along the length thereof. Also slidably engaged in dual fastening means 16 are auxiliary arms 17 which are in a plane normal to that of extension arms 15. Auxiliary arms 17 and dual fastening means 16 are rotatable about the axis of extension arms 15. Attached to one or more of the ends of the extension arms and/or auxiliary arms is an adaptor unit 18 to which a lighting system such as an electronic flash or light reflector 19 may be attached.

From the overall view of FIG. 1 it can be seen that the lighting unit can be adjusted relative to the subject to be photographed so as to provide light from any direction. The auxiliary arms may be moved within the dual fastening means 16 and then frictionally engaged at any position along their length. Likewise, the dual fastening means 16 may be moved anywhere along the length of the extension arm 15 and rotated thereabout in any rotatable position about the fixed axis. Obviously, one or more extension arm 15 can be utilized and extension arms 15 can be of the same or different lengths. Likewise, each extension arm may carry none, one or more dual fastening means and auxiliary arms. The number of dual fastening means 16, of extension arms 15 and auxiliary arms 17 utilized will be entirely dependent upon the needs of the photographer and the subject being photographed.

Figure 2:
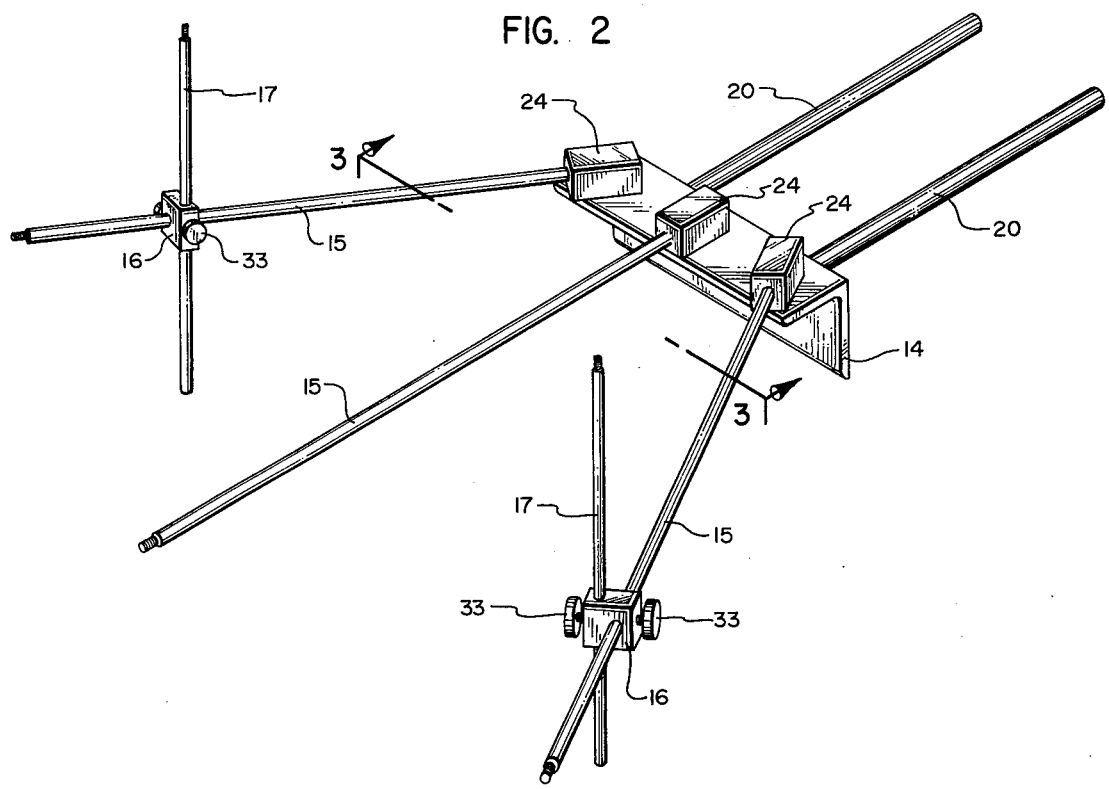
FIG. 2 is a top perspective view of the lighting platform having rods adapted to fit into a camera bellows framework.
Figure 3:
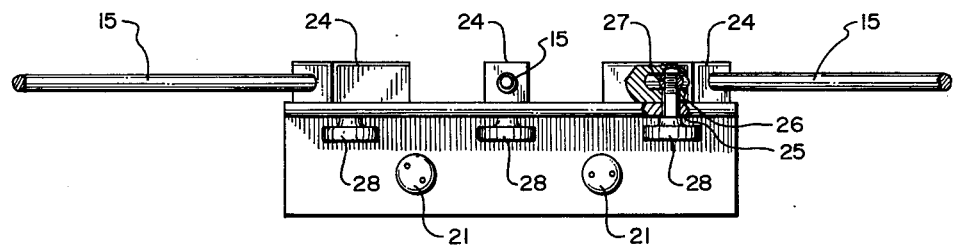
FIG. 3 is a front elevational view of FIG. 2 taken along lines 3—3 of FIG. 2.
Figure 4:
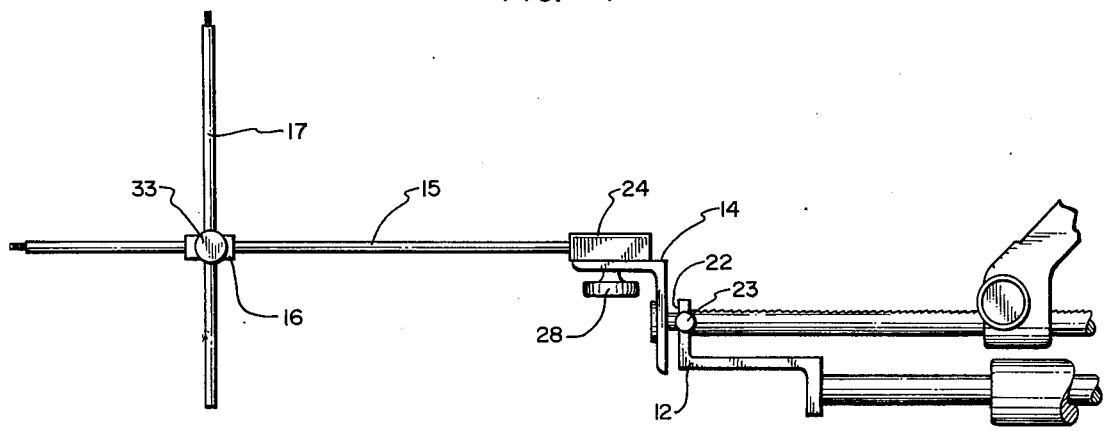
FIG. 4 is a side view of one configuration of the lighting platform showing a mounting rod partially inserted into the front of the camera bellows framework.

The attachment of the lighting platform 13 to the bellows framework 12, the attachment of the extension arms 15 to the mounting platform 14 and the attachment of dual fastening means 16 to the extension arms 15 are best illustrated with reference to FIGS. 1, 2, 3 and 4. As can be seen in any of these FIGS. mounting platform 14 is a solid piece of material of unitary construction having two sides at right angles. To one side is attached mounting rods 20 which are fixedly attached to mounting platform 14 by means of blind cap nuts 21 (FIG. 4). The mounting platform is made of any suitable solid material with aluminum being preferred because of its light weight. Two mounting rods 20 enter into accessory mounting holes 22 in the front end of the bellows framework 12. The depth into which mounting rods 20 will penetrate into the mounting holes 22 may be regulated by means of set screw 23 as shown in FIG. 4. Set screw 23 frictionally engages one of the mounting rods 20 and holds it in place when set screw 23 is tightened.

The extension arms 15 are preferably attached to the mounting platform 14 by means of pivot blocks 24. These blocks are preferably rectangular in shape and contain a longitudinal hole which is sized so that the extension arm 15 will slidably engage therein. Mounting platform 14 contains apertures 25 in the frame and pivot blocks 24 contain apertures 26 in the bottom thereof. The extension arms 15 contain a threaded hole 27 near the end thereof which hole is in the portion of arm 15 that is inserted into pivot blocks 24. When threaded hole 27 as shown in FIG. 4 is brought into alignment with holes 25 and 26, a locking screw 28 can be inserted through holes 25 and 26 and threaded into hole 27 thereby fixedly attaching the pivot block to the mounting frame. When locking screw 28 is loosened the pivot blocks are allowed to rotate sideways on mounting platform 14. When the desired pivotal position is attained locking screw 28 is tightened thereby fixedly engaging pivot block 24 and extension arm 15 in a fixed position.

Figure 5:
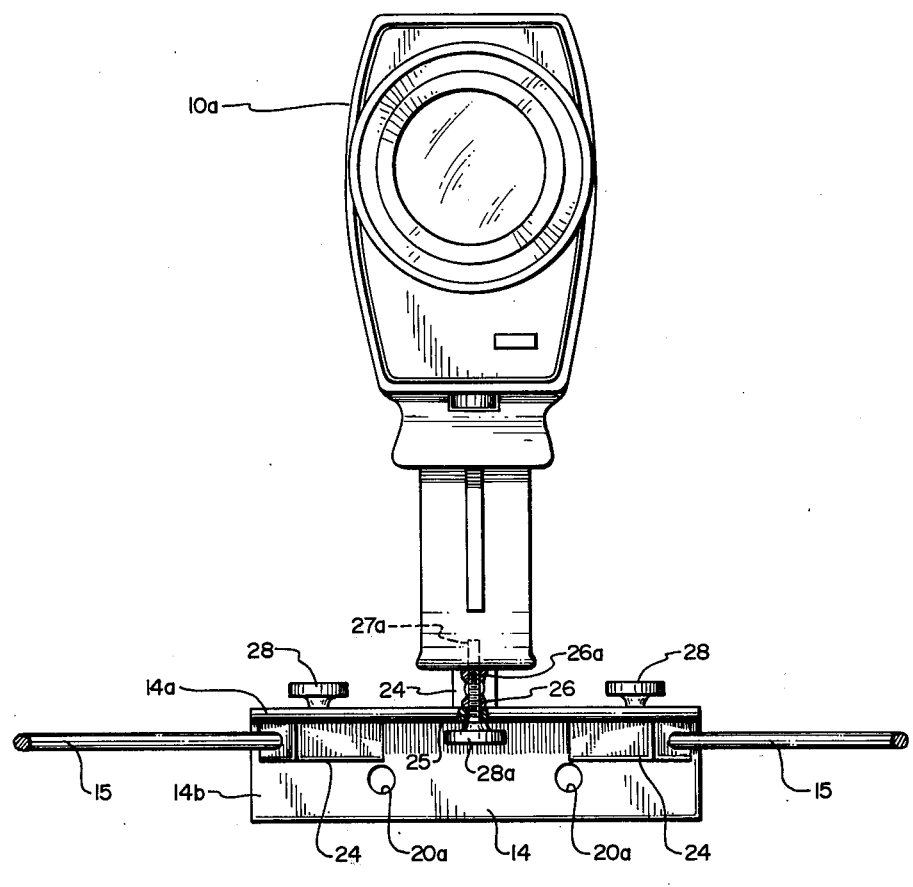
FIG. 5 is a front elevational view of a movie camera having the lighting platform directly attached to the base thereof.

The attachment of a lighting platform directly to a camera base, tripod or the like is best illustrated in FIG. 5. As shown, a movie camera 10a has a mounting platform 14 attached to the base thereof by means of an extended locking screw 28a. The center pivot block 24 contains holes 26 and 26a which extend entirely through pivot block 24. Locking screw 28a extends through hole 25 in the mounting platform 14 and through holes 26 and 26a in pivot block 24 and screw into 27a in the camera base. Blind cap nuts 21 and mounting rods 20 as shown in FIGS. 2 and 3 are removed leaving apertures 20a in the lower portion of framework 14. Or, if desired, framework 14 can consist of a flat strip 14a thereby eliminating the right angle portion 14b. It is to be noted that the pivot blocks 24 at the ends of mounting platform 14 are reversed from the position shown in FIGS. 1–4. This is merely one variation that can be utilized and other positions will be obvious to one having ordinary skill in the art. Other cameras, such as non-bellows cameras for still photography could also be used.

Figure 6:
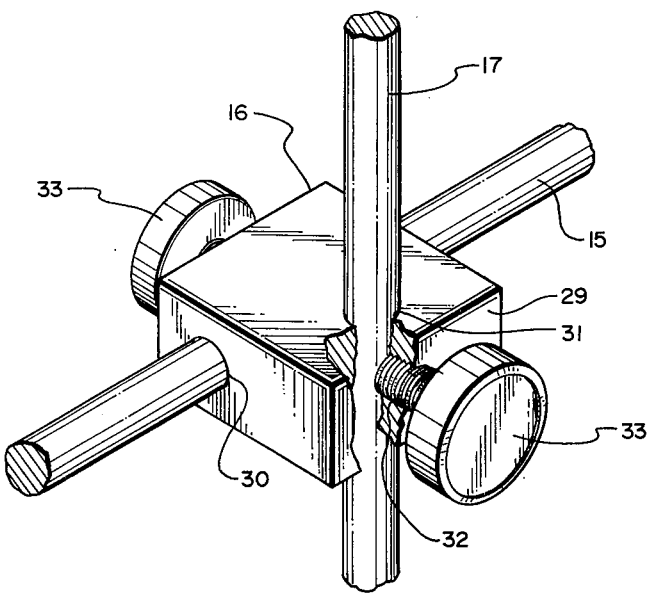
FIG. 6 is a partial breakaway view of a dual fastening means utilized to connect the extension arms and auxiliary arms.

The dual fastening means 16 is best described with reference to FIGS. 1, 2, 4 and 6, and more specifically with reference to FIG. 6. The dual fastening means is preferably in the form of a pivot block 29 containing planes each having outside walls two of which contains apertures 30 and 31 in said pivot block, which apertures are at right angles to each other. In the side walls of the third plane of pivot block 29 are threaded holes 32 which extend from said side walls into the opening of apertures 30 and 31 respectively. Screwed into the threaded hole 32 are locking screws 33. Apertures 30 and 31 are so sized that extension arms 15 and auxiliary arms 17 will slidably engage within said apertures. When extension arm 15 is slidably engaged in aperture 30, the pivot block 29 may be positioned at any point along the length of extension arm 15 and rotated about said extension arm until locking screw 33 which is engaged through aperture 32 to aperture 30 is tightened, thereby frictionally holding extension arm 15 in a fixed position. Likewise, auxiliary arm 17 may be slidably engaged at any position along its length through aperture 31 and rotated in any position about the longitudinal axis of auxiliary arm 17 until such time as locking screw 33 which is engaged through aperture 32 to aperture 31 is tightened thereby frictionally engaging auxiliary arm 16 and holding it fixedly in place. If desired two parallel apertures may be provided in the place of apertures 30 and 31 in each of the two perpendicular planes which would make further extension easier.

Extension arms 15 and auxiliary arms 17 are preferably cylindrical in shape and are made of lightweight solid material such as aluminum. Preferably these arms as well as the other portions of the lighting platform are made of a flat black anodized aluminum so that they will not reflect unwanted light. If desired, however, the arms may be of other configurations such as square, hexagonal, etc. The degree of rotation would be somewhat limited by the number of sides and for that reason a cylindrical shape is preferred.

Mounting platform 14 as shown in the FIGS. 1-4 contains the flat mounting portion in a position nearest the camera lens when mounted on a bellows framework. If desired, however, the mounting platform could be inverted without departing from the scope of this invention. In other words, the overall height between the extension arms and the camera lens is up to the photographer since the lighting platform can be used effectively in either position.

Figure 7:
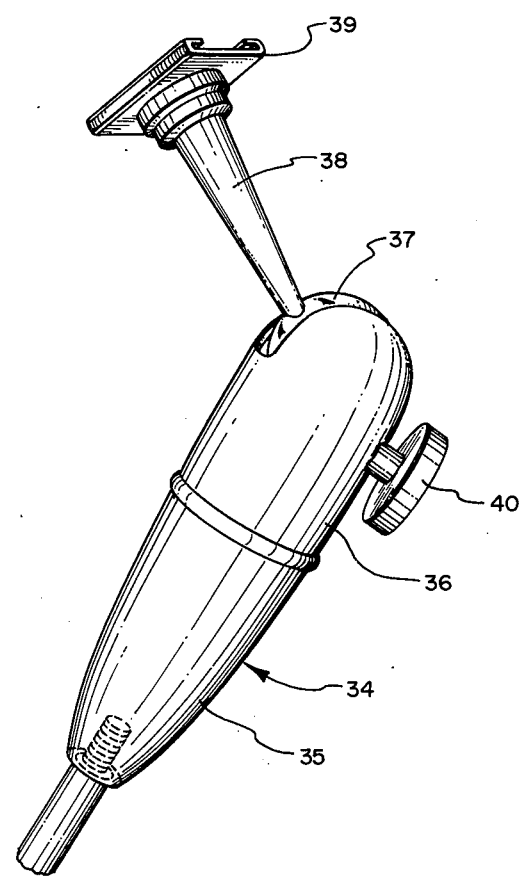
FIG. 7 is a side view of a flash adaptor unit without the electronic flash attached thereto taken along line 7—7 of FIG. 1.

The ends of extension arms 15 opposite the pivot blocks are either threaded or adapted for quick release clamps and at least one or both ends of each auxiliary arm is threaded or adapted for quick release clamps. If desired a counterweight may be attached to one end on auxiliary arm 17 to counterbalance the weight of the lighting unit 19 on the opposite end. The lighting adaptor unit 34 as illustrated in FIG. 7 can then be screwed or clamped onto the end of either the extension arms or auxiliary arms. Lighting adaptor unit 34 may be of any conventional design and the one illustrated, while a preferred embodiment, is not meant to be limiting as to the types of adaptors which may be used. As used herein, the term lighting adaptor unit is inclusive of adaptors holding backgrounds, reflectors, mirrors, prisms, scrims, filters, gobos, vignetters and other accessories. As shown in FIG. 7, adaptor unit 34 consists of a base portion 35 and an upper portion 36, a ball and socket joint 37 and an arm 38 fixedly attached to the ball and terminating in a female T-shoe receptacle 39. The upper portion of adaptor 34 also contains a set screw 40 which, when loosened, will allow the upper portion 36 to rotate 360° as compared to the stationary base 35. Both ball and socket 37 and the rotating upper portion 36 lock in place when set screw 40 is tightened.

The base of a lighting unit 19 or reflector or whatever apparatus is desired, is adapted to fit into the T-shoe receptacle 39.

It will be at once apparent that any combination and positioning of lighting units, reflectors, mirrors, gobos, filters, vignetters, prisms, backgrounds, etc. can be utilized within the scope of this invention. Although the invention has been described in what is deemed to be the preferred embodiment, it is recognized that departures may be made therefrom without departing from the scope of the invention which is not limited to the details disclosed and illustrated, but is to be accorded the full scope of the claims so as to include any and all equivalent devices and apparatuses.

What is claimed is:

1. A modular lighting platform for hand held closeup photography comprising
    a. a mounting platform adapted to be attached to a camera bellows or camera base,
    b. a plurality of outwardly oriented extension arms attached to said mounting platform by attaching means which allow said extension arms pivotal movement to either side and which can lock said extension arms in any pivotal position,
    c. dual fastening means slidably engaged on at least one extension arm rotatable about the longitudinal axis of said arm and containing means adapted only to secure said dual fastening means at any position along the length of the extension arm about which it is slidably
    d. at least one auxiliary arm slidable engaged in each dual fastening means across a plane normal to the extension arm, said dual fastening means also containing additional means adapted only to secure the auxiliary arm at any position along the length of said auxiliary arm.

2. A modular lighting platform according to claim 1 wherein at least one end of each auxiliary arm and the outward ends of the extension arms contain means for attaching a lighting unit or units.

3. A modular lighting platform according to claim 2 wherein the means for attaching the lighting unit or units are threads.

4. The modular lighting platform according to claim 3 wherein the attaching means for securing the extension arms to the mounting platform consist of rectangular pivot blocks having longitudinal holes into which the unthreaded ends of the extension arms are inserted, a hole in each rectangular pivot block perpendicular to and interengaging with the longitudinal holes in said pivot block, a threaded hole in each extension arm perpendicular to the longitudinal axis thereof and in alignment with the interengaging hole in said pivot block when the extension arm is inserted therein, a hole in the mounting platform for each pivot block which hole is in alignment with the hole in the pivot block and threaded hole in the extension arm, a threaded locking screw inserted through the holes in said mounting platform and pivot blocks and threaded into the hole in said extension arm, whereby the loosening of the locking screw allows pivotal movement of the extension arms and pivot block and the tightening of the locking screw secures the pivot block against the mounting platform in a fixed position.

5. The lighting platform according to claim 4 wherein the dual fastening means is a rectangular pivot block containing three planes having outside walls having arm apertures at right angles through two planes thereof, adapted to slidably engage an extension arm in one aperture and an auxiliary arm in the other aperture, said pivot block having threaded holes therein at opposite sides of the third plane extending from the outside wall into the nearest arm aperture and locking screws threaded into said holes the tightening of which will secure the pivot block fixedly to the extension or auxiliary arm.

6. A modular lighting platform according to claim 4 wherein the mounting platform has at least one mounting rod fixedly attached thereto, said rods being adapted to slidably fit into mounting holes in the front end of a camera bellows framework and having locking means for securing said mounting rod or rods into said mounting holes at any position along the length of said rod or rods.

7. A modular lighting platform according to claim 6 wherein the mounting platform is of unitary construction consisting of two flat sides at right angles, having attached to one side the mounting rod or rods and having attached to the other side the extension arms and pivot blocks.

8. The lighting apparatus according to claim 7 containing three extension arms.

9. The lighting apparatus according to claim 8 wherein the extension arms are of different lengths.

10. The lighting apparatus according to claim 6 wherein at least one lighting unit is attachable to the ends of the extension or auxiliary arms.

11. A modular lighting platform according to claim 4 wherein the mounting platform is directly attached to a camera base.

12. The lighting platform according to claim 11 containing two extension arms.

* * * * *